United States Patent Office 2,789,919
Patented Apr. 23, 1957

2,789,919

HYDROPHOBIC, ORGANOPHILIC PIGMENTS AND PROCESS OF PRODUCING THE SAME

John W. Eastes, Ridley Park, Pa., and Theodore F. Cooke, Martinsville, N. J., assignors to American Cyanamid Company, New York, N. Y., a corporation of Maine No Drawing. Application October 21, 1954,
Serial No. 463,823

20 Claims. (Cl. 106—308)

This invention relates to the preparation of improved pigments and more particularly is concerned with the preparation of pigments having improved hydrophobic and organophilic properties which make them very valuable pigments for use in lithographic printing inks, paints, enamels, etc.

Lithographic inks are customarily prepared by incorporating the pigment into a lithographic varnish. The resulting paste is ground and the finished ink is thereafter aged.

In lithography, the surface of the printing stone must be wet with a wetting solution, usually termed lithographic fountain solution, for each impression before the ink is applied in order to prevent the ink from adhering to the non-reproducing portions of the surface. When the moistened stone is thereafter inked in the usual manner the ink adheres to the greasy or oily portion of the stone and is repelled from the moist or wet portions of the stone. The pigment used in such inks, since it must have a strong affinity for the greasy design, must be preferentially wet with hydrocarbons (organophilic) and since it must have no affinity for the wet portions of the stone it must be water-repellent (hydrophobic). Moreover, because the fountain solution usually contains a small amount of acid in order to etch the surface of the stone slightly so as to keep the lines sharp, it is extremely important that the lithographic ink have resistance to breakdown by the fountain solution as otherwise the ink is too bodied for proper flow or there is bleed and disintegration of the ink.

We have discovered a novel method of treating pigments so as to impart thereto greatly improved hydrophobic and organophilic properties which make them especially suitable for use in lithographic inks.

Essentially, the present invention comprises coating the pigment particles with a small amount of an isocyanate of the general formula RNCO in which R is an aliphatic hydrocarbon radical containing at least 6 carbon atoms as elaborated upon more fully hereinafter.

The pigment may be treated with the isocyanates in an anhydrous solvent system, that is, by slurrying the pigment in dry toluene, for example, and thereafter adding an isocyanate-toluene solution thereto, followed by heating the resultant mixture, then filtering and drying the pigment. Also, there may be instances where additional heating is advantageous. Or, the pigment may be slurried in an aqueous emulsion of the isocyanate, and thereafter filtering, drying and heating as in the organic solvent process.

The pigments resulting from the aforementioned treatments are extremely hydrophobic, satisfactorily organophilic and possess good resistance to lithographic fountain solution. The final products consist of loosely-bound pigment particles coated with the coating composition and the mass is readily disintegrated to yield discrete particles of pigmentary dimensions and as such are suitable for direct use as pigments. The coating is strongly adherent and is not removed when the pigment is ground in vehicles to provide a lithographic printing ink. Moreover, the pigments of the present invention are very readily wet by organic vehicles of the lithographic ink. The adherent coating is permanent in character and is not removed or attacked by the acidic lithographic fountain solution as evidenced by the fact that a lithographic ink made from the treated pigments does not undergo any bleed or disintegration after complete incorporation into a lithographic solution.

The pigments of the present invention are also useful in emulsion paints, i. e., aqueous emulsions of film-forming materials. In order to obtain an emulsion of a pigmented organic film-forming material which will dry to a glossy film it is necessary that the pigment be present entirely in the oil phase as any pigment in the water phase is deposited on the surface of the film and produces a flat surface when the water evaporates. Since the pigments of the present invention are both hydrophobic and organophilic, it is evident that they permit the formulation of emulsified oil paints which will dry to a glossy film.

The pigments of the present invention are relatively permanently water-repellent due to a chemical reaction that is thought to occur between certain groups on the pigment and the isocyanates. Solvent extraction of the treated pigments reduces the water-repellency of the pigments slightly with the removal of a wax-like material. X-ray diffraction examination of the treated pigments shows no change in crystal structure from that of the untreated pigments. On the other hand, however, electron diffraction examination and infrared examination show no isocyanate groups present in the treated pigments.

The pigments treated in accordance with the present invention are extremely resistant to wetting with water whereas untreated pigments are almost instantly wet with water. In addition, the treated pigments are easily and preferentially wet with hydrocarbons. For example, when a mixture of treated pigment and toluene is shaken with water the pigment stays in the toluene phase or collects at the toluene-water interface and does not go into the water phase as the untreated pigment readily does.

The water-repellency of the treated pigments is in proportion to the amount of isocyanate applied. A distinctly water-repellent pigment is obtained when the weight of the isocyanate is as little as 2–3%. It is preferred, however, that the pigment contain from about 10% to about 25% by weight of the isocyanate as in this range the pigment exhibits very satisfactory water-repellence and resistance to lithographic fountain solution.

The temperature and length of heating in order to develop more fully the water-repellent properties of the coating is not unduly critical. Temperatures of about 100° C. or lower may be employed, and in many instances refluxing the mixture produces satisfactory results. In other instances where a more strongly hydrophobic pigment is desired the pigment may be subjected to an additional heating step for about 5 to 30 minutes at temperatures of between 120° C. and 160° C.

The invention includes the use of the isocyanates as hereinafter described for treating pigments in order to render them hydrophobic and organophilic and is applicable to such pigments as titanium dioxide of either the rutile or the anatase crystalline form, ultramarine blue, iron blue, lead chromate, known commercially as primrose yellow, hydrated iron oxide, known commercially as hyferox yellow, vat pigments, for example, 5,5'-dichloro-7,7'-dimethyl-2,2'-bisthionaphthene indigo, known commercially as vat violet, azo pigments, for example, metanitroparaanisidine coupled with the nitranilide of 2-hydroxy-3-naphthoic acid, known commercially as maroon toner, etc.

It has been found that a useful test for measuring the water-repellency of the treated pigments is to stir 4 parts of the pigment with 4 parts of water in a 50 ml. beaker using a blunt glass rod for stirring. Under such conditions untreated hydrophilic pigments such as ultramarine blue and titanium dioxide wet instantly and some of the organic pigments require a few seconds for wetting. The treated pigments of the present invention, on the other hand, require considerably more time to wet by this test, some requiring as long as 500–600 seconds.

The isocyanates found useful in the present invention for the treatment of pigments for the purpose of rendering the pigments hydrophobic and organophilic are isocyanates having an aliphatic hydrocarbon chain containing at least 6 carbon atoms. Isocyanates having either saturated or unsaturated hydrocarbon chains have been found to be useful. Thus we may use such isocyanates as hexylisocyanate, dodecylisocyanate, hexadecylisocyanate, heptadecylisocyanate, octadecylisocyanate, etc. or the corresponding alkenyl or alkadienyl isocyanates, e. g. octadecenylisocyanate, octadecadienylisocyanate, and the like. Since the water-repellency of the treated pigments appears to be greater when subjected to the action of the higher members of the series, it is preferred to use isocyanates of a relatively long carbon chain length.

Although the pure alkyl, alkenyl or alkadienyl isocyanates as described may be used in treating the pigments, it is an advantage of the present invention that the commercially available amines, which are used to prepare the isocyanates of the present invention by reaction of the amines in toluene with phosgene, as described in U. S. Patent No. 2,303,363, and which frequently are mixtures of alkyl, alkenyl or alkadienyl amines, have been found to produce excellent results, and since such mixtures of amines are commercially available and hence are cheaper than the pure compounds, the use of mixtures of isocyanates is preferred in this invention.

Thus we have used successfully such isocyanate mixtures as (1) a mixture composed of 30% n-hexadecylisocyanate, 25% n-octadecyl-isocyanate and 45% n-octadecenylisocyanate; (2) a mixture composed of 90% n-octylisocyanate, 7% decylisocyanate and 3% hexadecylisocyanate; (3) a mixture composed of 93% octadecylisocyanate, 6% hexadecylisocyanate and 1% octadecenylisocyanate; and (4) a mixture composed of 45% octadecadienylisocyanate, 35% octadecenylisocyanate and 10% octadecylisocyanate. Obviously, the described mixtures are illustrative only and it is to be understood that the present invention is not limited to the use of these precise mixtures as other mixtures of varying compositions of higher alkyl, alkenyl or alkadienyl isocyanates may be used with equally good results.

The invention will be described in greater detail in conjunction with the following specific examples, the parts being by weight unless otherwise specified.

*Example 1*

100 parts of hydrated iron oxide were slurried in 500 parts of dry toluene and then 10 parts of an isocyanate mixture consisting of 30% n-hexadecylisocyanate, 25% n-octadecylisocyanate and 45% n-octadecenylisocyanate was added to the mixture at room temperature. The mixture was heated to the boil and refluxed for 1 hour. The pigment was thereafter filtered, washed with toluene, dried on the filter and then subjected to additional heating at 140° C. for 20 minutes. The resultant product when tested for water-repellency by the procedure outlined hereinbefore was satisfactorily water-repellent whereas a similar but untreated hydrated iron oxide wet practically instantaneously.

*Example 2*

100 parts of the pigment prepared from meta-nitroparanisidine coupled with the nitranilide of 2-hydroxy-3-naphthoic acid were slurried in 500 parts of dry toluene after which 10 parts of the isocyanate mixture as used in Example 1 were added and stirred for 1 hour. The mixture was heated to the boil and refluxed 1¼ hours after which it was cooled to 30° C. The pigment was filtered, washed with toluene and air dried overnight. It was then heat-treated at 150° C. for 25 minutes. The finished pigment when tested for water-repellency by the procedure set forth hereinabove was satisfactorily water-repellent whereas a similar but untreated pigment wet with water very readily.

*Example 3*

100 parts of 5,5′-dichloro-7,7′-dimethyl-2,2′-bisthionaphthene indigo were slurried in 500 parts of dry toluene. 10 parts of the isocyanate mixture as used in Example 1 were added and the mixture was stirred for 30 minutes. The mixture was refluxed for 1 hour during which time 250 parts of toluene were added. The mixture was cooled to 60° C. with stirring and the solvent was evaporated in vacuo up to 90° C. at 20 mm. mercury pressure. The dried pigment was thereafter heat-treated at 150° C. for 30 minutes. The finished pigment was water-repellent whereas a similar but untreated pigment was very hydrophilic.

*Example 4*

100 parts of lead chromate were slurried in 500 parts of dry toluene. 5 parts of the isocyanate mixture as used in Example 1 were added and the mixture was stirred for 45 minutes. The mixture was then refluxed for 1 hour, cooled and evaporated in vacuo up to 95° C. at 30 mm. of mercury pressure after which the residue was allowed to stand overnight. The finished pigment was then heat-treated at 147° C. for 30 minutes. The resultant pigment was very water-repellent whereas a similar but untreated pigment was quite hydrophilic.

*Example 5*

100 parts of iron blue, 500 parts of dry toluene and 10 parts of the isocyanate mixture as used in Example 1 were stirred for 50 minutes at room temperature. The mixture was refluxed for 1 hour, cooled and evaporated in vacuo up to 95° C. at 30 mm. mercury pressure. The finished pigment was then heat-treated at 143° C. for 25 minutes. The finished pigment was quite hydrophobic but the untreated pigment was very hydrophilic.

*Example 6*

100 parts of ultramarine blue were slurried in 500 parts of dry toluene after which 25 parts of the isocyanate mixture as used in Example 1 were added and the mixture was agitated for 30 minutes. The mixture was heated to the boil and refluxed for 1 hour after which it was cooled with stirring for 1 hour. The pigment was then filtered, washed with toluene and dried at 57° C. under 18 inches of vacuum for 18 hours. The treated pigment when tested for water-repellency by the procedure set forth hereinabove was satisfactorily water-repellent whereas a similar but untreated ultramarine blue wet almost instantly.

*Example 7*

100 parts of titanium dioxide were slurried in 500 parts of dry toluene and the mixture was refluxed for 2½ hours. The mixture was then cooled to 60° C. 20 parts of hexylisocyanate were added and the mixture was refluxed for 2½ hours after which it was cooled to 30° C. and evaporated up to 95° C. at 30 mm. mercury pressure for 30 minutes. The treated pigment when tested for water-repellency by the procedure set forth hereinabove was water-repellent whereas a similar but untreated titanium dioxide wet almost instantly.

*Example 8*

100 parts of an ink type titanium dioxide were slurried in 500 parts of dry toluene and 25 parts of the isocyanate mixture as used in Example 1 were added. The mixture was stirred for 1 hour and then heated to reflux and refluxed for 1 hour after which it was cooled to 30° C., filtered and washed with toluene. The pigment was then heat-treated at 150° C. for 25 minutes. The treated pigment was quite hydrophobic whereas a similar but untreated titanium dioxide was quite hydrophilic.

Example 9

100 parts of titanium dioxide were slurried in 500 parts of dry toluene. 10 parts of the isocyanate mixture as used in Example 1 were added and the mixture was stirred for 30 minutes. The mixture was heated to reflux and refluxed for 1¼ hours and was then cooled to 30° C., filtered and washed with toluene. The pigment was then heat-treated at 145° C. for 20 minutes. The treated pigment had excellent hydrophobic properties whereas a similar but untreated titanium dioxide pigment was hydrophilic.

Example 10

The procedure of Example 6 was repeated except that 25 parts of laurylisocyanate were substituted for the isocyanate mixture used therein. A satisfactory hydrophobic ultramarine blue pigment was obtained.

Example 11

The procedure of Example 9 was repeated except that 10 parts of cetylisocyanate were substituted for the isocyanate mixture used therein. A satisfactory hydrophobic titanium dioxide pigment was obtained.

Example 12

A lithographic printing ink was prepared from the pigment resulting from the treatment specified in Example 6 by grinding 36 parts of the pigment in 24 parts of No. 1 lithographic varnish. 20 parts of the resulting ink and 50 parts of lithographic fountain solution composed of 1000 parts of water, 1.3 parts of potassium acid tartrate, 10.2 parts of $Zn(NO_3)_2 \cdot 6H_2O$ and 18.4 parts of gum arabic, the solution having a pH of 3.4–3.8 were placed in a mechanical mixer having rotating and intermeshing blades and run for 10 minutes so as to test the resistance of the ink to the fountain solution. Observations were then made for loss of flow, bleed and disintegration of the ink. These observations indicated that the ink prepared with the treated pigment had satisfactory resistance to the lithographic fountain solution in that there was no bleed or disintegration of the ink.

Example 13

Ten parts of titanium dioxide were slurried in 50 parts of dry toluene. To this slurry, 1 part of an isocyanate mixture consisting of 90% n-octylisocyanate, 7% decylisocyanate and 3% hexadecylisocyanate was added. The mixture was stirred and refluxed for one hour and then allowed to cool to room temperature. The mixture was thereafter filtered and the pigment dried overnight at 50° C. in a vacuum of 30 inches of mercury. The product of this example was tested for its hydrophobic character by the test described hereinabove. The treated pigment required 180 seconds to form the paste described in the test procedure. The original untreated titanium dioxide required only 8 seconds to form the same paste.

Example 14

Example 13 was repeated except that the isocyanate mixture of that example was replaced with an isocyanate mixture consisting of 93% octadecylisocyanate, 6% hexadecylisocyanate and 1% octadecenylisocyanate. The product of this example required 630 seconds to form the wet paste in the described test procedure compared with 8 seconds for the original untreated titanium dioxide pigment.

Example 15

Example 13 was repeated replacing the isocyanate mixture of that example with an isocyanate mixture consisting of 45% octadecadienylisocyanate, 35% octadecenylisocyanate and 10% octadecylisocyanate. By the described test procedure, the product of this example required 562 seconds to form a wet paste compared with 8 seconds to obtain a similar result with the original untreated titanium dioxide pigment.

This application is a continuation-in-part of our application, Serial No. 325,234, filed December 10, 1952, now abandoned.

We claim:

1. The method of producing a hydrophobic, organophilic pigment which comprises intimately associating with the pigment a small but effective amount of a treating agent consisting of a monoisocyanate of the formula RNCO in which R is an aliphatic hydrocarbon radical containing from about 6 to 18 carbon atoms and heating the pigment at a temperature of about 100° C. to 160° C. to develop the hydrophobic, organophilic properties of the isocyanate.

2. The method according to claim 1 in which the isocyanate contains hydrocarbon chains which are substantially unsaturated.

3. The method according to claim 1 in which the isocyanate is principally octadecylisocyanate.

4. The method according to claim 1 in which the isocyanate is a mixture consisting of approximately 30% hexadecylisocyanate, 25% octadecylisocyanate and 45% octadecenylisocyanate.

5. The method according to claim 1 in which the isocyanate is a mixture consisting of approximately 93% octadecylisocyanate, 6% hexadecylisocyanate and 1% octadecenylisocyanate.

6. The method according to claim 1 in which the isocyanate is a mixture consisting of approximately 45% octadecadienylisocyanate, 35% octadecenylisocyanate and 10% octadecylisocyanate.

7. The method of producing a hydrophobic, organophilic pigment which comprises slurrying the pigment in a solution of a treating agent consisting of a monoisocyanate of the formula RNCO in which R is an aliphatic hydrocarbon radical containing from about 6 to 18 carbon atoms, and heating the pigment at a temperature of about 100° C. to 160° C. to develop the hydrophobic, organophilic properties of the isocyanate.

8. The method according to claim 7 in which the isocyanate contains hydrocarbon chains which are substantially unsaturated.

9. The method according to claim 7 in which the isocyanate is principally octadecylisocyanate.

10. The method according to claim 7 in which the isocyanate is a mixture consisting of approximately 30% hexadecylisocyanate, 25% octadecylisocyanate and 45% octadecenylisocyanate.

11. The method according to claim 7 in which the isocyanate is a mixture consisting of approximately 93% octadecylisocyanate, 6% hexadecylisocyanate and 1% octadecenylisocyanate.

12. The method according to claim 7 in which the isocyanate is a mixture consisting of approximately 45% octadecadienylisocyanate, 35% octadecenylisocyanate and 10% octadecylisocyanate.

13. The method of producing a hydrophobic organophilic pigment which comprises intimately associating with the pigment from 2 to 25% by weight of a treating agent consisting of a monoisocyanate of the formula RNCO in which R is an aliphatic hydrocarbon radical containing from about 6 to 18 carbon atoms and heating the pigment at a temperature of about 100° C. to 160° C. to develop the hydrophobic, organophilic properties of the isocyanate.

14. The method according to claim 13 in which the isocyanate is a mixture of approximately 30% hexadecylisocyanate, 25% octadecylisocyanate and 45% octadecenylisocyanate.

15. The method of producing a hydrophobic, organophilic pigment which comprises slurrying the pigment in a solution of from 2 to 25% of a treating agent consisting of a monoisocyanate of the formula RNCO in which R is an aliphatic hydrocarbon radical containing from about 6 to 18 carbon atoms, and heating the pigment at a temperature of about 100° C.–160° C. to develop the hydrophobic, organophilic properties of the isocyanate.

16. The method according to claim 15, in which the isocyanate is a mixture consisting of approximately 30% hexadecylisocyanate, 25% octadecylisocyanate and 45% octadecenylisocyanate.

17. A hydrophobic, organophilic pigment, the particles of which are coated with a small but effective amount of a hydrophobic, organophilic treating agent consisting of a monoisocyanate of the formula RNCO in which R is an aliphatic hydrocarbon radical containing from about 6 to 18 carbon atoms, which coating has been heat bonded to the surface of the pigment by the process of claim 4.

18. A hydrophobic, organophilic pigment according to claim 17 in which the R is principally an unsaturated aliphatic hydrocarbon radical containing from about 6 to 18 carbon atoms.

19. A hydrophobic, organophilic pigment according to claim 18 in which the R is principally the octadecyl radical.

20. A hydrophobic, organophilic pigment, the particles of which are coated with from 2 to 25% weight of a hydrophobic, organophilic treating agent consisting of a monoisocyanate of the formula RNCO in which R is an aliphatic hydrocarbon radical containing from about 6 to 18 carbon atoms, which coating has been heat bonded to the surface of the pigment by the process of claim 4.

References Cited in the file of this patent

UNITED STATES PATENTS

| | | |
|---|---|---|
| 2,284,895 | Hanford et al. | June 2, 1942 |
| 2,296,066 | Sloan | Sept. 15, 1942 |
| 2,358,475 | Pratt et al. | Sept. 19, 1944 |
| 2,388,656 | Lichtly et al. | Nov. 6, 1945 |
| 2,457,591 | Moore | Dec. 28, 1948 |

OTHER REFERENCES

Diseren's "The Chemical Technology of Dyeing and Printing," New York (1948), page 198.

Disclaimer 2,789,919.—*John W. Eastes*, Ridley Park, Pa., and *Theodore F. Cooke*, Martinsville, N.J. HYDROPHOBIC, ORGANOPHILIC PIGMENTS AND PROCESS OF PRODUCING THE SAME. Patent dated Apr. 23, 1957. Disclaimer filed Apr. 8, 1963, by the inventors and the assignee, *American Cyanamid Company*.

Hereby enter this disclaimer to claim 1 of said patent.

[*Official Gazette June 18, 1963.*]

Notice of Adverse Decision in Interference

In Interference No. 90,142 involving Patent No. 2,789,919, J. W. Eastes and T. F. Cooke, Hydrophobic, organophilic pigments and process of producing the same, final decision adverse to the patentees was rendered Jan. 23, 1963, as to claim 1.

[*Official Gazette July 23, 1963.*]